(12) United States Patent
Miller et al.

(10) Patent No.: US 11,187,296 B2
(45) Date of Patent: Nov. 30, 2021

(54) TUNED MASS ABSORBER ASSEMBLY AND SYSTEM FOR ATTENUATING FREQUENCY SPECIFIC VIBRATIONAL ENERGY

(71) Applicant: Raytheon Company, Waltham, MA (US)

(72) Inventors: Brett A. Miller, McKinney, TX (US); Michael Martinez, McKinney, TX (US)

(73) Assignee: Raytheon Company, Waltham, MA (US)

( * ) Notice: Subject to any disclaimer, the term of this patent is extended or adjusted under 35 U.S.C. 154(b) by 113 days.

(21) Appl. No.: 16/205,090

(22) Filed: Nov. 29, 2018

(65) Prior Publication Data

US 2020/0173511 A1 Jun. 4, 2020

(51) Int. Cl.
*F16F 15/02* (2006.01)
*F16F 7/108* (2006.01)
*F16F 1/38* (2006.01)

(52) U.S. Cl.
CPC ............ *F16F 7/108* (2013.01); *F16F 1/3814* (2013.01)

(58) Field of Classification Search
CPC ............. F16F 7/104; F16F 7/108; F16F 7/116
USPC .......................................................... 188/380
See application file for complete search history.

(56) References Cited

U.S. PATENT DOCUMENTS

| | | | |
|---|---|---|---|
| 2,885,891 A * | 5/1959 | Wilson | G01L 1/2206 73/147 |
| 3,572,112 A * | 3/1971 | Igoe | G01M 9/04 73/147 |
| 5,687,948 A | 11/1997 | Whiteford et al. | |
| 5,775,472 A | 7/1998 | Osterberg et al. | |
| 6,065,742 A | 5/2000 | Whiteford | |
| 7,690,872 B2 * | 4/2010 | Hashimoto | B23Q 11/0035 409/141 |
| 9,033,301 B1 * | 5/2015 | Toossi | E04H 9/021 248/560 |
| 2006/0175169 A1 | 8/2006 | Or et al. | |

(Continued)

FOREIGN PATENT DOCUMENTS

JP 2006-029549 A 2/2006

OTHER PUBLICATIONS

International Search Report for International Application No. PCT/US2019/053496 dated Dec. 20, 2019, 18 pages.

*Primary Examiner* — Bradley T King

(57) ABSTRACT

A tuned mass absorber assembly comprises a mass structure, and a flexure system comprising first and second flexure sections (e.g., cross bar flexures) supported by, and extending in opposing directions from, the mass structure. The flexure system can comprise flexure section mounts situated at distal ends of the first and second flexure sections, respectively, and that are operable to mount the tuned mass absorber assembly to a structure subject to induced vibrations therein. A mass of the mass structure and a stiffness of the flexure system can be tuned to attenuate vibrations at a specific input frequency generated in response to induced vibrations of the structure. A system can comprise a vibration isolator attached to a chassis (e.g., of an airplane), and supporting a payload (sensors(s)) and isolating the payload from vibrations. A tuned mass absorber assembly can be mounted to the vibration isolator for attenuating vibrations at a specific input frequency that may affect the payload.

20 Claims, 9 Drawing Sheets

(56) References Cited

U.S. PATENT DOCUMENTS

| | | | |
|---|---|---|---|
| 2008/0308368 A1* | 12/2008 | Gustavsson | F16F 7/104 |
| | | | 188/380 |
| 2012/0103739 A1* | 5/2012 | Song | F16L 1/123 |
| | | | 188/378 |
| 2013/0264419 A1* | 10/2013 | Rammer | F16F 7/116 |
| | | | 244/108 |
| 2016/0319895 A1* | 11/2016 | Griffin | F16F 7/1011 |
| 2017/0370438 A1 | 12/2017 | Cabuk et al. | |
| 2018/0045600 A1 | 2/2018 | Hovik et al. | |
| 2019/0186576 A1* | 6/2019 | Tamaki | F16F 15/022 |
| 2020/0124128 A1* | 4/2020 | Elias | F16F 15/03 |
| 2020/0217386 A1* | 7/2020 | Kordunsky | G05B 19/042 |
| 2020/0278007 A1* | 9/2020 | Gustavsson | F16F 7/108 |

* cited by examiner

TUNED MASS ABSORBER ASSEMBLY AND SYSTEM FOR ATTENUATING FREQUENCY SPECIFIC VIBRATIONAL ENERGY

GOVERNMENT LICENSE RIGHTS

This invention was made with Government support. The Government has certain rights in the invention.

BACKGROUND

Some mechanical systems, such as rotors and blades of aircraft engines, generate vibration energy or tones of vibration at specific harmonic frequencies when operated. If these tones coincide with structural modes of the system, they can create a resonance condition that results in unacceptable levels of vibration in multiple axes. Such specific frequencies can affect sensitive electronics, such as electro-optical sensors and other sensors, along different axes of vibration. One solution for attenuating such vibration involves incorporating a tuned mass damper (TMD) within the mechanical system that includes a number of springs, spring stages, masses, fluid dampers, and other components. However, TMDs can consume considerable space or volume within the system. Some TMDs can include a damping fluid, which can be a problem in low temperature or high altitude environments, or both. Some TMDs do not attenuate energy very well at a specific frequency, and can suffer from damage in high shock environments.

Stop devices on prior TMD systems are typically required to prevent damage to TMD springs, flexures, or masses upon an impact shock event or impact load. Thus, stop devices are typically required to be installed on a structure secondary to the TMD mass to restrict movement and prevent damage. In such prior systems, there would necessarily be a number of spatial gaps between the TMD mass and respective stop devices supported by the secondary structure. However, the distance of such gaps rely on compounded tolerance variations that are generated between multiple assemblies of the system when manufacturing and assembling the TMD and the secondary structure. Accounting for such compounded tolerance variations requires match machining of a number of components during manufacture to achieve the required gap tolerances so that the gap tolerances are similar to each other, and are not beyond an acceptable tolerance range. In some cases, this problem affects interchangeability of different TMDs on different secondary structures.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
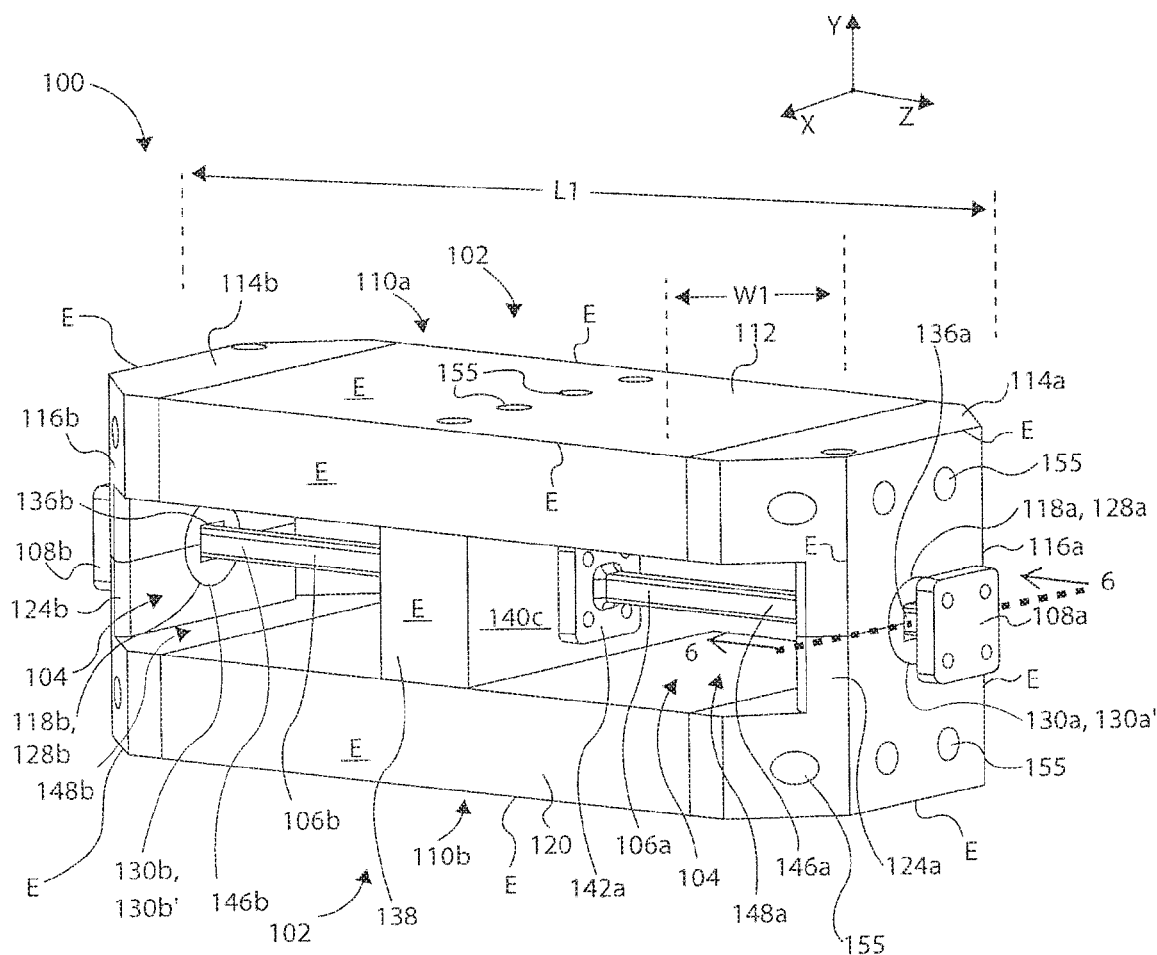
FIG. 1 is an isometric view of a tuned mass absorber assembly, in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The present disclosure sets forth a tuned mass absorber assembly, comprising a mass structure; a flexure system comprising first and second flexure sections supported by, and extending in opposing directions from, the mass structure; and flexure section mounts situated at distal ends of the first and second flexure sections, respectively, operable to mount the tuned mass absorber assembly to a structure subject to induced vibrations, wherein a mass of the mass structure and a stiffness of the flexure system are selected and designed to tune the tuned mass absorber assembly to attenuate vibrations at a range of input frequencies that include a specific input frequency generated in response to induced vibrations of the structure.

The present disclosure also sets forth a system for attenuating vibrations of a range of frequencies, that includes a specific input frequency, tending to propagate to an electronics assembly payload, the system comprising a vibration isolator having a first mount body coupleable to a support structure chassis, and a second mount body coupled to the first mount body by at least one compliant device, wherein the second mount body is in support of an electronics assembly payload; a mass structure; and first and second flexure sections supported by, and extending in opposing directions from, the mass structure, each of the first and second flexure sections having a flexure section mount attached to one of the first or second mount bodies of the vibration isolator, such that the mass structure is suspended by the first and second flexure sections about the vibration isolator, wherein the mass structure and the first and second flexure sections define a tuned mass absorber assembly, wherein a mass of the mass structure and a stiffness of the first and second flexure sections are selected and designed to tune the tuned mass absorber assembly to attenuate vibrations at a specific range of frequencies that includes a specific input frequency generated in response to induced vibrations of the support structure chassis.

The present disclosure further sets forth a system for attenuating vibration at a specific input frequency to an electronics assembly payload, comprising a mass structure; first and second flexure sections supported by, and extending in opposing directions from, the mass structure, each of the first and second flexure sections having a flexure section mount; a mechanical system operable to generate vibrations, and comprising a support structure chassis subjectable to the vibrations at a specific input frequency, the support structure chassis coupled to the flexure section mounts of the first and second flexure sections; and an electronics assembly payload having a support structure coupled to the flexure section mounts of the first and second flexure sections, wherein a mass of the mass structure and a stiffness of the first and second flexure sections are selected and designed to attenuate vibration of the specific input frequency from the support structure chassis to the electronics assembly payload.

The present disclosure still further sets forth a method for facilitating the attenuation of excessive vibrations acting on a payload, the method comprising identifying vibrations acting on a payload that are induced in response to operation of a mechanical system in support of the payload, the vibrations being propagated to the payload through a structure coupling the payload to the mechanical system, the structure comprising one or more modes; determining a range of input frequencies, including a specific input frequency, of those of the vibrations that are representative of excessive vibrations acting on the payload; selecting a mass structure having a given mass; selecting a flexure system having a given stiffness; and forming a tuned mass absorber assembly by supporting the mass structure from the flexure system, the tuned mass absorber assembly corresponding to the range of input frequencies and the specific input frequency.

Figure 2:
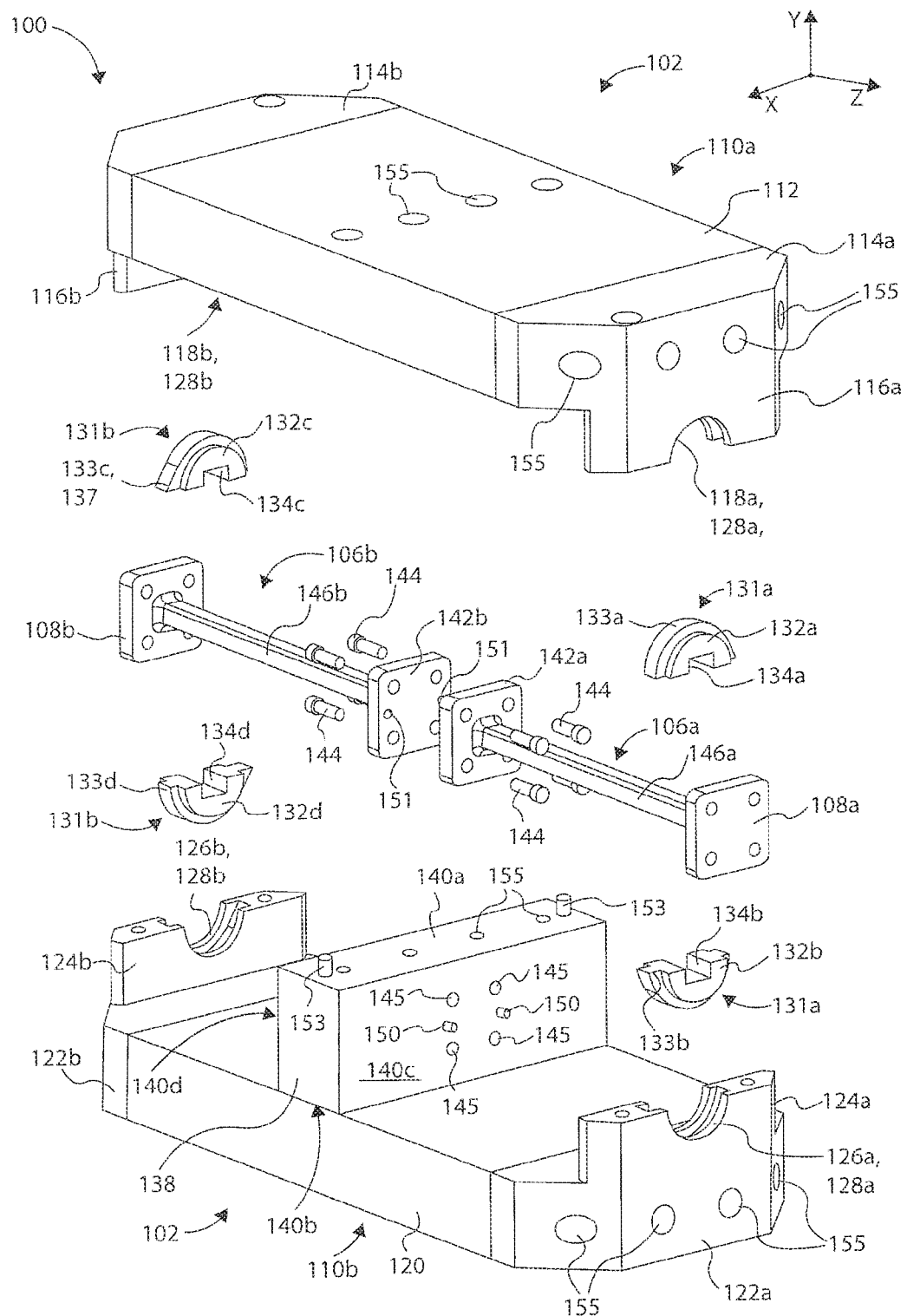
FIG. 2 is a partially exploded view of the tuned mass absorber assembly of FIG. 1.

The method can further comprise coupling the tuned mass absorber assembly to the structure at the one or more modes of the structure to facilitate creation of new system modes, wherein, during operation of the mechanical system, the tuned mass assembly shifts the one or more modes of the structure to their desired frequencies, and minimizes amplification of the range of frequencies and the specific input frequency while simultaneously creating an anti-resonance. To further describe the present technology, examples are now provided with reference to the figures. With reference to FIGS. 1 and 2, in one example a tuned mass absorber assembly 100 can comprise a mass structure 102 and a flexure system 104. As further detailed below, a mass of the mass structure 102 and a stiffness of the flexure system 104 can be selected and designed to tune the tuned mass absorber assembly 100 to attenuate vibration at a desired or identified or anticipated specific range of frequencies that include a specific input frequency generated (or anticipated to be generated) in response to induced vibrations of or from a structure, such as those transferred from a support structure or chassis of a mechanical system (e.g., a mechanical system can include systems such as a vehicle, aircraft, engine, electro mechanical system, and others). The tuned mass absorber assembly 100 operates by coupling with the modes of the structure to which it is attached (e.g., the tuned mass absorber assembly can attach or couple to a structure with excessive vibration at a specific frequency (such as an isolated payload), or to a vibration isolator). As will be explained in further detail below, new system modes can be created with the mass of the tuned mass absorber assembly 100 interacting with otherwise existing payload modes. By minimizing overall damping, amplification is minimized at a specific frequency. Critical modes are shifted to their desired frequencies while simultaneously creating an anti-resonance. The interacting can result in constructive or destructive interference with input vibrations, such that the net result is that overall vibration transmitted to the payload is reduced, particularly at a specific frequency range. In one example, the tuned mass absorber assembly 100 can be separately tunable in multiple axes. Compliance can also be added in a transverse axis to provide up to three axes of vibration tone attenuation.

The flexure system 104 can comprise first and second flexure sections. In one example, the first and second flexure sections can be defined by a first flexure and a second flexure, these being separate components from one another. In a specific example, which is not intended to be limiting in any way, the first and second flexures can comprise cross bar flexures, which can mean components shaped as a beam of some geometric cross-section along their length with attachment features at each end. The cross bar flexures set, when attached to each other at their proximal ends across some other intermediate component (e.g., a mass), spans a gap in the parent structure which is provided for mounting the cross bar flexures, and ultimately the whole tuned mass absorber assembly. As shown, a first cross bar flexure 106a and a second cross bar flexure 106b, respectively, can be supported by the mass structure 102 and can extend in opposing directions from the mass structure 102. The flexure system 104 can comprise first and second flexure section mounts 108a and 108b situated at distal ends of the first and second cross bar flexures 106a and 106b, respectively, and that are operable or configured to mount the tuned mass absorber assembly 100 to a structure subject to induced vibrations, as further detailed below (see e.g., FIGS. 3 and 4).

More specifically, the mass structure 102 can comprise a multi-piece mass that includes a first mass section 110a comprising a mass plate 112 and a pair of half or mating coupling bodies 114a and 114b situated or located on or about (e.g., attached (e.g., fastened), or integrally formed with the first mass section 110a, or otherwise situated on or about) either ends of the mass plate 112. The half or mating coupling bodies 114a and 114b can each comprise a coupling flange portion 116a and 116b, respectively, which extends away from the mass plate 112 toward the cross bar flexures 106a and 106b. The coupling flange portions 116a and 116b can comprise respective first and second stop support half openings 118a and 118b, and can thereby be situated at opposite ends of the first mass section 110a. In one example, as shown, each stop support half opening 118a and 118b can be formed in a half circle.

Similarly, in a generally mirror-like or congruent configuration, the mass structure 102 can comprise a second mass section 110b comprising a mass plate 120 and a pair of half or mating coupling bodies 122a and 122b situated or located on or about (e.g., attached (e.g., fastened), or integrally formed with the second mass section 110b, or otherwise situated on or about) either ends of the mass plate 120. The half or mating coupling bodies 122a and 122b can each comprise a coupling flange portion 124a and 124b, respectively, that extends away from the mass plate 120 toward the cross bar flexures 106a and 106b. The coupling flange portions 124a and 124b can comprise respective first and second stop support half openings 126a and 126b, and can thereby be situated at opposite ends of the second mass section 110b. In one example, as shown, each stop support half opening 126a and 126b can be formed in a half circle. Thus, because the first and second mass sections 110a and 110b are substantially mirrored of or congruent to each other, when assembled together the stop support half openings 118a and 126a are situated or positioned together, and cooperate to form and define a first stop support 128a as part of a first flexure stop 130a (having a full circle opening defined by the stop support half openings 118a and 126a). Likewise, on the other end the stop support half openings 118b and 126b are situated or positioned together to cooperate to form and define a second stop support 128b as part of a second flexure stop 130b (having a full circle opening defined by the stop support half openings 118b and 126b). Note that the "full circle openings" may only be circular about their inside diameters, because an inner annular recess may not be exactly circular to accommodate for properly seating or clocking compliant bumpers, as further discussed below.

To avoid a rigid hard stop interface between the first and second cross bar flexures and the first and second flexure stops 130a and 130b, respectively, first and second compliant bumpers 131a and 131b can be secured within the first and second stop supports 128a and 128b, respectively, thus providing a compliant interface between the first and second cross bar flexures and the first and second flexure stops 130a and 130b that functions to progressively dissipate or absorb the kinetic energy in the moving cross bar flexures, such as could potentially be generated in response to a sufficient impact or shock within the system. In other words, the first and second flexure stops 130a and 130b can comprise compliant flexure stops 130a' and 130b'.

In one example, the first and second compliant bumpers 131a and 131b can each be comprised of a single, unitary body (i.e., can comprise a single piece design). In another example, as shown in FIG. 2, the first and second compliant bumpers 131a and 131b can each comprise a multi-piece design or configuration. For example, the first compliant bumper 131a can be comprised of first and second compliant bodies 132a and 132b, which can be inserted into respective stop support half openings 118a and 126a, such that upon coupling the first and second mass sections 110a and 110b together, the first and second compliant bodies 132a and 132b are brought together to form the first compliant bumper 131a, to provide a compliant interface, and to essentially make the first flexure stop 130a a compliant flexure stop 130a'. The same can be said for compliant bodies 132c and 132d and the formation of the second compliant bumper 131b to make the second flexure stop 130b a compliant flexure stop 130b'. Each compliant body 132a-d can comprise any desired shape or configuration. In the example shown, each compliant body 132a-d comprises a generally semi-circle shaped profile with a half square opening 134a-d, respectively, formed about an inner surface and that cooperate with adjacent/mated half square openings to define respective first and second apertures 136a and 136b. Outer portions of each compliant body 132a-d can comprise a radial flange 133a-d, respectively, that mates or that interfaces with or that are received by respective radial channels (not labeled) of the stop support half openings 118a, 118b, 126a, and 126b, which properly holds and/or positions respective first and second compliant bodies 132a-d within the respective stop support half openings.

Note that the radial flanges 133a-d may not be circular shaped or arced along their entire radial length; rather, a section or end portion of the radial flange may have a clocking transition portion 137, such as a linear surface profile (see e.g., flange 133c, having a transition portion 137). In this way, the clocking transition portion 137 (of each compliant bumper) can be seated into a corresponding or mating recess in the respective stop support half openings. Such configuration properly seats the compliant bumpers in their intended positions, so that they do not rotate or move, which would cause undesirable shifting or rotation of the first and second apertures 136a and 136b. This can prevent the compliant bumpers 131a and 131b from inadvertently contacting the respective cross bar portions 146a and 146b during normal operation, because the compliant bumpers are properly clocked or situated in their desired positions. This "clocking" configuration eliminates the need for fasteners or other fastening means to support and secure the compliant bumpers to the mass structure, which reduces the complexity of the system and minimizes attenuation factors to account for during design of the system.

The apertures formed by the first and second stop supports 128a and 128b, or the first and second apertures 136a and 136b of the first and second compliant bumpers 131a and 131b, if secured within the first and second stop supports 128a and 128b, respectively, can be sized and shaped (e.g., have a cross-sectional area) to be larger than that of cross bar portions 146a and 146b of the first and second cross bar flexures 106a and 106b, as further detailed below, such that the cross bar portions 146a and 146b of the first and second cross bar flexures 106a and 106b are "loosely" fit through these apertures. By "loosely fit" this means that at least some of the outer surfaces of the cross bar portions 146a and 146b do not interface with or are not biased against any portion of the flexure stops 130a and 130b (or compliant flexure stops 130a' and 130b') when the system is in a non-attenuating state and not performing an attenuating function, even if there is at least some contact of another portion of the cross bar portions 146a or 146b or both with any portion of the flexure stops 130a and 130b (or compliant flexure stops 130a' and 130b'), respectively. Stated differently, loosely fit can mean that the cross bar portions 146a and 146b are free to move in one or more degrees of freedom (e.g., along the x or y axes, or both) at least to some degree prior to coming in contact with the first or second flexure stops 130a and 130b (or compliant flexure stops 130a' and 130b'). Indeed, the first and second flexure stops 130a and 130b (or compliant flexure stops 130a' and 130b'), are sized and configured to provide at least some degree of a space or gap between their inner surfaces and the outer surfaces of the first and second cross bar portions 146*a* and 146*b*, respectively. This space or gap can occur in two directions, or along two axes, such as along the x and y axes as designated in the drawings. This configuration allows the cross bar flexures 106*a* and 106*b* to freely move or sway in the identified x axis and the y axis, while providing a travel limit stop via the flexure stops 130*a* and 130*b* (or compliant flexure stops 130*a*' and 130*b*') to prevent the cross bar flexures 106*a* and 106*b* from over flexing or over extending during an impulse shock event, which protects the cross bar flexures 106*a* and 106*b* from damage or fatigue, as further discussed below.

The mass structure 102 can further comprise one or more intermediate mass sections. In the example shown, the one or more intermediate mass sections comprises a single center mass section 138, which can be formed as a cuboid having an upper side 140*a* that is interfaced and attached (e.g., fastened) about an inner side of the mass plate 112, and a lower side 140*b* that is interfaced or attached to an inner side of the opposing mass plate 120. The center mass section 138 can have a length substantially equivalent to a width W1 of the opposing mass plates 112 and 120, and can be centrally located between longitudinal ends of the mass structure 102 for purposes of proper balancing for attenuating vibrations. Notably, a length L1 of the mass structure 102 is greater than the width W1 of the mass structure 102, which produces an elongated tuned mass absorber assembly 100. In this manner, a large portion or percentage of the mass of the mass structure is near or adjacent the length or axis of the cross bar flexures. This configuration may be beneficial because a longer L1 than width W1 can accommodate longer flexures, and longer or elongated flexures naturally have a lower stress for a given stiffness, and can therefore have a longer fatigue life and larger displacement limits (as compared to shorter flexures). Moreover, a longer L1 than width W1 may be beneficial to minimize or reduce a torsional moment of inertia (about the z axis) of the tuned mass absorber assembly, which keeps the torsional natural frequency from being too low. It is contemplated, and those skilled in the art will recognize, that the one or more intermediate mass sections can comprise other intermediate mass sections between the first and second mass sections other than at a center or mid-point, or a plurality of mass sections offset from one another, these also being operable with the flexure system 104. For example, two intermediate mass sections can be situated between the first and second mass sections, these being offset from one another an equidistance or in accordance with some other spacing arrangement.

Figure 5A:
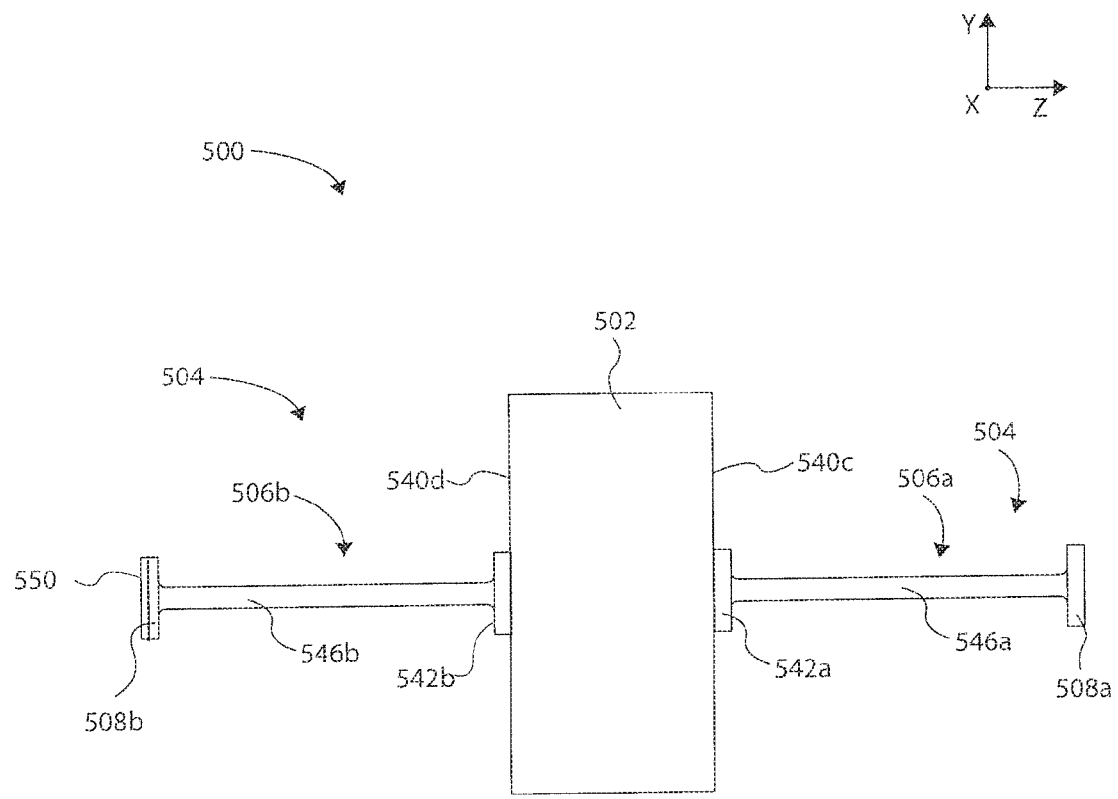
FIG. 5A is a side view of a tuned mass absorber assembly, in accordance with an example of the present disclosure.

In the example shown, each cross bar flexure 106*a* and 106*b* comprises a respective flexure coupling (in the form of a flange or plate or base in the example shown) 142*a* and 142*b* at its proximal end (that end nearest the mass structure) that mounts to left and right sides 140*c* and 140*d* of the center mass section 138 of the mass structure 102, respectively (see FIG. 5A). The flexure couplings 142*a* and 142*b* can comprise plates or brackets or flanges or other mounting structures having apertures for receiving fasteners 144 (four each) that mount or attach the respective cross bar flexures 106*a* and 106*b* to the center mass section 138 via threaded holes 145 of opposing sides of the center mass section 138.

Figure 6:
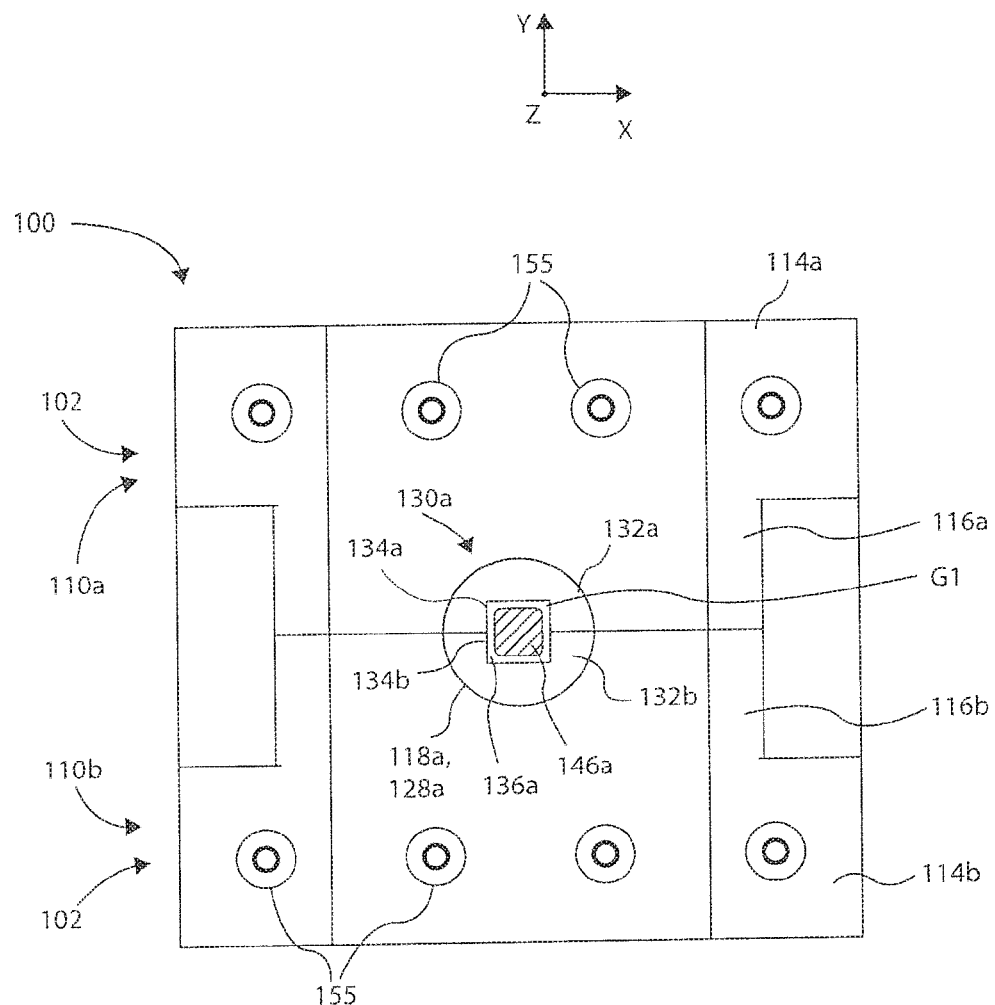
FIG. 6 is a cross sectional view of the tuned mass absorber assembly of FIG. 1, taken across lines 6-6.

The cross bar flexures 106*a* and 106*b* can comprise the respective elongate cross bar portions 146*a* and 146*b* that each extend longitudinally along the z axis as elongated bars or beams between respective flexure couplings 142*a* and 142*b* and first and second flexure section mounts 108*a* and 108*b*. As best shown in FIGS. 1 and 6, the elongate cross bar portions 146*a* and 146*b* extend loosely (i.e., unobstructed) through the first and second apertures 136*a* and 136*b*, respectively, of the first and second compliant flexure stops 130*a*' and 130*b*', as also noted above.

The elongate cross bar portion 146*a* extends through the first aperture 136*a*, which provides a gap G1 (e.g., a radial gap in this case) between an outer perimeter surface of the elongate cross bar portion 146*a* and an inner perimeter surface of the first compliant flexure stop 130*a*'. Because the cross bar flexures 106*a* and 106*b* are designed and selected to comprise a specific stiffness that may be insufficient to maintain structural integrity under an impulse shock event (e.g., the flexures may excessively bend or even break), the compliant flexure stops 130*a*' and 130*b*' operate to limit deflection of the cross bar flexures 106*a* and 106*b* to prevent this from occurring. Indeed, the gaps G1 (present in both compliant flexure stops 130*a*' and 130*b*') permit or allow each of the respective cross bar flexures 106*a* and 106*b* to move or sway in directions along both the x and y axes a sufficient distance or amount needed to attenuate the intended specific tone vibrations about the x axis and the y axis, while providing a limit or stop to prevent the cross bar flexures 106*a* and 106*b* from over flexing or over extending during an impulse shock event (such impulse or shock causing the respective cross bar flexures 106*a* and 106*b* to potentially move or sway a distance or amount so as to cause them to impact the compliant flexure stops 130*a*' and 130*b*'). The compliant flexure stops 130*a*' and 130*b*', comprising the compliant bumpers 131*a* and 131*b* formed of a compliant material (i.e., an elastic material, such as rubber, polymer, etc.), can function to prevent a stress point or to prevent damage to the cross bar flexures in the event of shock, because the compliant flexure stops 130*a*' and 130*b*' tend to cushion or absorb impact from the cross bar flexures so that they will not directly impact the rigid surface of the mass structure 102. Due to the modular design of the tuned mass absorber assembly 100, and particularly the mass structure 102, the compliant bumpers 131*a* and 131*b* can be readily removed and replaced, for example, if they are worn or damaged, or if other compliant bumpers are desired, such as having a different size or shape of the stop aperture, for instance. Specifically, in this example, the various components of the first and second mass sections can be disassembled and then re-assembled in the event the compliant bodies 132*a* and 132*b* need to be replaced for any reason.

As best shown in FIG. 1, the first and second mass sections 112*a* and 112*b*, and the center mass section 138, collectively define a first chamber area 148*a* and a second chamber area 148*b* defined by the surfaces and boundaries of such components of the mass structure 102. In this way, a majority of the first cross bar flexure 106*a* is situated in or disposed through the first chamber area 148*a*, and a majority of the second cross bar flexure 106*b* is situated in or disposed through the second chamber area 148*b*, which places a majority of the mass structure 102 around or surrounding the first and second cross bar flexures 106*a* and 106*b*. This helps to balance the attenuation of vibrations in the x and y axes. The fraction of cross bar length situated within the structure, and therefore the stop impact point, is also a design consideration for stress margin of the flexures during a shock event. Taken with the stop gap dimension (deflection travel), it creates one side of a triangle which describes the deflected shape of the cross bar flexure compared to the at-rest position.

The mass structure 102 can define a three dimensional perimeter envelope E defined by the outer perimeter edges/surfaces of the components of the mass structure 102 (see FIG. 1). As can be appreciated from the view of FIG. 1, a volume of mass defined by the mass structure 102 can consume or envelop a majority of the space of the three dimensional perimeter envelope E. In this way, the tuned mass absorber assembly 100 is relatively compact, meaning that a majority of the actual physical volume of the mass of the mass structure 102 can be packaged tightly within the three dimensional volume that the mass structure 102 is situated. Thus, a large amount of mass (e.g., more than 50% of the envelope E) can be packaged into the tuned mass absorber assembly 100, which minimizes the envelope E required for a given, specific design prescription of mass, and likewise maximizes the amount of vibrational energy attenuated by the mass structure 102 for a given envelope E. Being a "compact package", the tuned mass absorber assembly 100 can fit or be positioned within a smaller volume, which may be required or advantageous in some systems. And, more mass can be added as desired within a given volume, which can improve the attenuation of vibration because it can attenuate a wider range of input vibration frequencies, which may be required or advantageous in some systems.

Note that the various mass structural components of the mass structure 102 can include a number of pins and holes and fasteners that can be used to coupled together the various components, and in relatively tight tolerances, to achieve a nominal crossbar-to-stop gap of 0.050+/−0.010 inches (e.g., gap G1). Of course, other crossbar-to-stop gap distances are contemplated herein depending upon the particular application. For instance, the center mass section 138 can include pins 150 (two each) mounted on either side 140*c* and 140*d* that are tightly received in respective bores 151 (two each) of each of the respective flexure couplings 142*a* and 142*b*. This helps to clock and properly position the cross bar flexures 106*a* and 106*b* with respect to the mass structure 102 to achieve a desired mounting position, which can achieve a relatively tight tolerance crossbar-to-stop gap (i.e., the tolerances of the gap G1). Similarly, pins 153 can be supported about the upper side 140*a* of the central mass body 138 (and on the lower side (pins not shown)), which are tightly received in bores of the plates 112 and 120 (not shown). Some fastening holes of the mass structure 102 will be labeled as holes 155, which are holes for receiving a number of bolts/fasteners (not shown) that attach together the various masses or components of the mass structure 102 to generate the assembly shown in FIG. 1.

As can be appreciated, the tuned mass absorber assembly 100 can be substantially symmetrical about three different planes (xyz) that are orthogonal to one another, and that extend or intersect through a central point of the tuned mass absorber assembly 100 (i.e., a center point or center of mass of the center body section 138). In this manner, the mass of the assembly 100 can be balanced and symmetrical in all three axes, which helps to balance or equalize the attenuation of vibration in both the x axis and y axis via the cross bar flexures 106*a* and 106*b*.

Note that the "multi-piece" mass structure 102 is merely an example of a mass structure of the present disclosure. Accordingly, other multi-piece mass structures are contemplated herein that can comprise two or more masses or components having a variety of shapes, sizes, and configurations that can be attached together to define a mass structure that supports one or more cross bar flexures that can be attached to a structure. Regardless of the amount of masses or mass components that make-up a particular mass structure, the tuned mass absorber assemblies contemplated herein can be designed to reduce or minimize moving parts (as compared to the aforementioned/traditional TMDs), thus improving performance of the device because more mass can improve attenuation of vibration, because the tuned mass absorber assembly can attenuate a wider range of input frequencies. The elimination of moving parts enhances the durability of the assembly, and improves performance by reducing parasitic drag, and it is less costly to design and manufacture. Moreover, it is contemplated that a single cross bar flexure can be incorporated into a particular tuned mass absorber assembly of the present disclosure (e.g., FIG. 5B), or a plurality of cross bar flexures can be incorporated, such as two, three or more, for a particular design.

As noted above, the first and second cross bar flexures 106*a* and 106*b* can comprise respective flexure section mounts 108*a* and 108*b* that are operable to mount to a structure that generates a specific input frequency in response to induced vibrations, or is subjected to vibrations emanating from a structure, such as from a support structure or chassis of a mechanical system (e.g., vehicle, airplane). The flexure section mounts 108*a* and 108*b* can be any type or shape, such as plates, brackets, or other support mounts that can be fastened or otherwise attached to a structure and that secure to the elongate crossbar portions of the flexure section mounts 108*a* and 108*b*.

Figure 3:
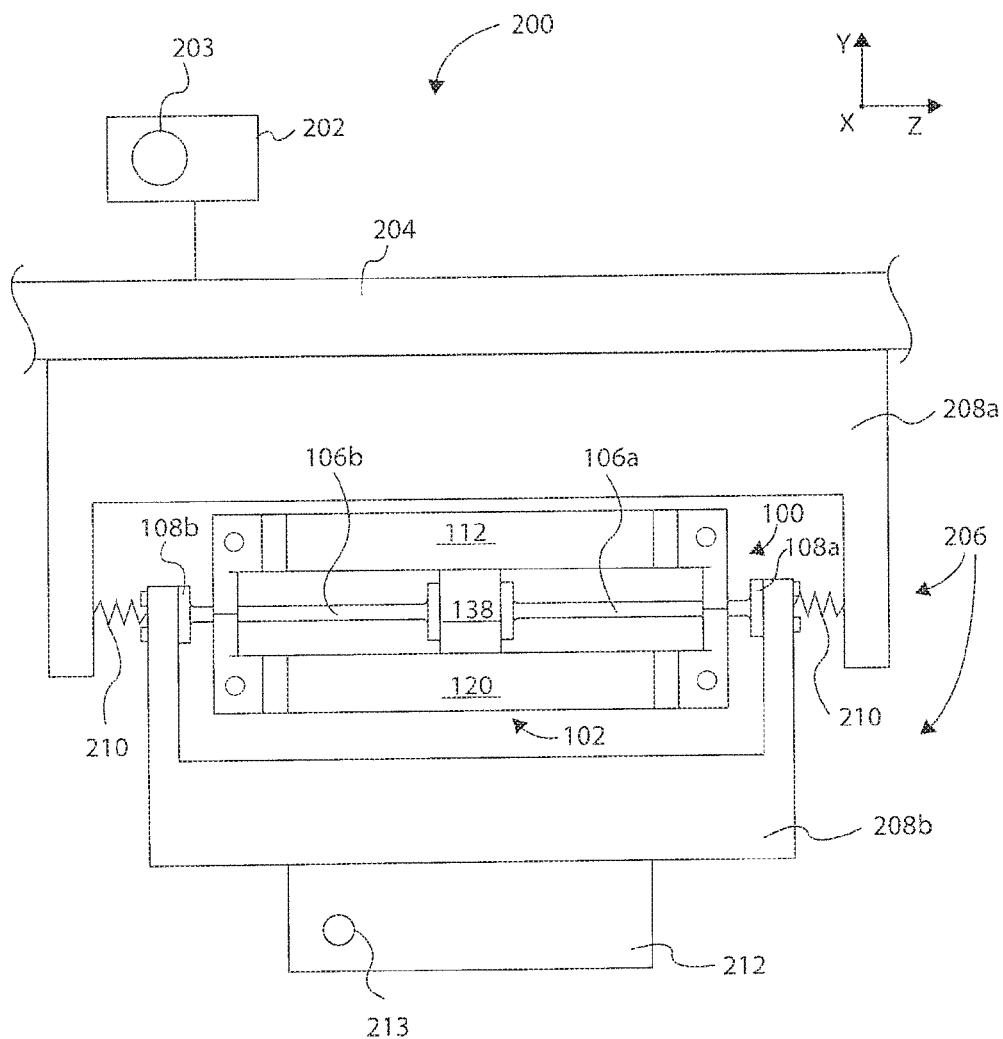
FIG. 3 is a side view of the tuned mass absorber assembly of FIG. 1, the tuned mass absorber assembly being coupled to a vibration isolator supported by a chassis and supporting an electronics assembly payload, in accordance with an example of the present disclosure.

FIG. 3 shows one example of a system 200 that incorporates the exemplary tuned mass absorber assembly 100 of FIGS. 1 and 2 for attenuating vibration of a specific input frequency to an electronics assembly payload. More specifically, the system 200 can comprise a mechanical system 202 (shown schematically), such as a vehicle, aircraft, engine, electro mechanical system, or other mechanical system that generates vibrational energy that can result in a sine tone frequency, such as a specific input frequency generated from operation of a rotational device 203 (e.g., a rotor or propeller driven aircraft). The mechanical system 202 can comprise a support structure chassis 204 (e.g., a frame or chassis of a vehicle like an aircraft). The system 200 can further comprise a vibration isolator 206 that comprises a first mount body 208*a* attached or coupled to the support structure chassis 204, and a second mount body 208*b* coupled to the first mount body 208*a* by at least one compliant device 210 (e.g., spring, elastomer, flexure, etc.). The second mount body 208*b* can support a payload, in this case an electronics assembly payload 212 (e.g., electro optical device, detector, sensor, or other sensitive electronics assembly), which can be mounted or fastened to the second mount body 208*b*. Note that the vibration isolator 206 is shown generically and schematically as having first and second bodies coupled to each other by at least one compliant device. Even though FIG. 3 illustrates a generic representation of a vibration isolator, this configuration facilitates isolating or attenuating vibrations and/or shock impacts from reaching a sensitive electronics or mechanical assembly payload attached to a mechanical device or system that vibrates when operated. Unlike prior systems, it will be appreciated that the first mount body 208*a* can be a rigid support structure or body that can be fastened to the chassis 204, and that can have a circular or torus shaped body, such that the tuned mass absorber assembly 100 is situated within a central opening of the torus shaped body. Similarly, the second mount body 208*b* can be a rigid support structure or body (also torus shaped) that can be coupled to the first mount body 208*a* by one or more compliant devices 210, where the tuned mass absorber assembly 100 is mounted to the second mount body 208b inside of the opening of the torus shaped body via the flexure section mounts 108a and 108b of the first and second cross bar flexures 106a and 106b, respectively, being coupled to the second mount body 208b.

The compliant device(s) 210 are operable to isolate or attenuate certain frequencies of vibration (and shock) from the chassis 204 to the electronics assembly payload 212 to protect it from damage, but there may be one or more particular input frequencies of vibration that may not be readily attenuated by the compliant device(s) 210, such as a specific sine tone frequency generated from a rotor of a propeller engine of an airplane, for instance. Such specific input frequency can have a negative or undesirable effect on the electronics assembly payload 212, because it can affect electronics devices 213 of the payload, such as circuit boards, fiber optics lines, mirrors, CCDs, CMOSs, etc., including the transfer and processing of signals of the electronics assembly payload 212.

As a beneficial solution to attenuate the undesirable specific input frequency from negatively affecting the payload, such as the components of the electronics assembly payload 212, the tuned mass absorber assembly 100 can be mounted to the second mount body 208b of the vibration isolator 206, such as illustrated in FIG. 3. Indeed, the flexure section mounts 108a and 108b can be attached (e.g., fastened, adhered, or otherwise secured) to a corresponding flexure mount body or portion of the second mount body 208b of the vibration isolator 206. Thus, the mass structure 102 is somewhat suspended or caused to float by the first and second cross bar flexures 106a and 106b about the vibration isolator 206. As noted above, the mass structure 102 can be configured (e.g., a mass, a size, a shape, or any other property of the mass structure 102), and a stiffness of the first and second cross bar flexures 106a and 106b, can be designed and selected to attenuate vibrations at an identified specific input frequency from the support structure chassis 202 to the electronics assembly payload 212. For instance, a total mass of the mass structure 102 can be selected to be a particular mass (as well as a particular shape and size), which corresponds to a selected/designed stiffness value of each of the first and second cross bar flexures 106a and 106b. In one example, the mass structure 102 can be comprised of a rigid material, such as tungsten (or other metals, or composites, or other rigid materials). Tungsten is relatively dense and heavy compared to other metals, such as steel, aluminum, etc., so its use may be a suitable material for the mass components of the mass structure 102.

Regarding "tuning" the stiffness of the first and second cross bar flexures 106a and 106b, the stiffness of such beams or cross bar flexures is dependent upon material type and condition (ultimately the flexural modulus of the material), cross sectional size and shape, length of the active cross section, and any further influences of the transition between the flexures active cross section and attachment features at the end constraints (e.g., 108a, 142a), which can be pinned, clamped, or in between. In one example, the first and second cross bar flexures 106a and 106b can be comprised of stainless steel, such as 13-8Mo H-1025 high-strength CRES, or other rigid materials, such as many metals, composites, polymers, etc. Thus, a length of the first and second cross bar flexures 106a and 106b, and the cross sectional size and shape of the flexure portion 146a and 146b, can be selected to attenuate vibrations at a specific input frequency in dual axes (x axis and the y axis). Attenuation in different axes can be the same or different in terms of the capabilities of the tuned mass absorber assembly, and the specific frequencies attenuated. If the cross sectional area of the first and second cross bar flexures 106a and 106b is a square (FIG. 6) or circle (FIG. 8), the first and second cross bar flexures 106a and 106b can equally attenuate a specific input frequency occurring in both axes as a result of similar vibrations in both axes. However, the frequency of maximum attenuation can be different for the x and y axes in the cases of a square or circular cross sectional area depending on the natural frequencies of the base isolator, for instance. If an input frequency is different in one axis compared to the other axis, a cross sectional area of the cross bar flexures can be formed as a rectangle, for instance, which will attenuate different input frequencies in the different x and y axes, as further discussed below.

In one example, a method for facilitating the attenuation of excessive vibrations acting on a payload (e.g., an electronics assembly payload), and for attenuating vibrations at a range of input frequencies that include a specific input frequency can comprise identifying vibrations acting on the payload that are induced in response to operation of a mechanical system (e.g., 200) in support of the payload, the vibrations being propagated to the payload through a structure coupling the payload to the mechanical system, the structure comprising one or more modes. The method can further comprise determining a range of input frequencies, including a specific input frequency, of those vibrations that are representative of the excessive vibrations acting on the payload. This can be achieved by operating known measurement devices that measure input frequencies experienced at the payload.

In one example, assume such determined range of input frequencies includes a specific input frequency of approximately 10 Hz that is an identified input frequency of excessive vibrations desired to be mitigated. In this example, if a "valley" of the range of input frequency amplitudes is desired in the transfer function of the mechanical system is from 9 to 11 Hz, the designed tuned mass absorber assembly should be tuned to attenuate vibrations having frequencies within this range, and specifically at or near the measured/determined input frequency of 10 Hz. Based on this determined input frequency, the material, the shape, the size, and the mass of the mass structure (e.g., 102) can be specifically selected, such that it is tuned or corresponds to the determined input frequency of 10 Hz (while taking into consideration other variables of all participating elements to establish the target natural frequency of the tuned mass absorber assembly), and the first and second cross bar flexures (e.g., 106a and 106b) can be sized and shaped to attenuate vibrations within the range of 9 to 11 Hz, when in operation with the mass structure to form a tuned mass absorber assembly, and specifically at or near the determined input frequency of 10 Hz. Such selection or customization of the mass structure and the first and second cross bar flexures to form a tuned mass absorber assembly generates a certain anti-resonance at the critical sine tone frequency (i.e., determined input frequency) generated by vibrations of the mechanical system. Thus, new system modes are created with the tuned mass absorber assembly, which is out of phase with the electronics assembly payload. This shifts critical modes to their desired frequencies while simultaneously creating such anti-resonance functions. For example, prior to coupling the tuned mass absorber assembly 100 to the second mount body 208b (FIG. 3), existing modes of the isolated structure will be known. That is, the second mount body 208b and the electronics assembly payload 212 will have modes where they oscillate due to deflection of the isolators or compliant devices 210. For simplicity, assume there will be one translational mode in each of the x, y, and z directions. After the tuned mass absorber assembly 100 is installed, two new modes are created in both the x and y directions. Since the tuned mass absorber assembly 100 is "stiff" in the z direction, new modes are not created in this direction. The new modes in the x and y directions involve the mass structure 102 moving in-phase and out-of-phase with the second mount body 208b and the electronics assembly payload 212.

In one example, finite element modeling (i.e., a software program) can be utilized to determine or "tune" the mass of the mass structure and the stiffness of the flexures based on a known or determined input frequency range or a specific input frequency of a particular system. Thus, depending on the desired attenuation of frequency in the x and y directions, the stiffness of the flexures can be selected through finite element modeling, for instance. Of course, it is contemplated, and those skilled in the art will appreciate, that vibrations within other designated frequency ranges, that include a designated specific input frequency, can be attenuated by a differently tuned mass absorber assembly. As such, the specific frequency range and the specific input frequency described above are not intended to be limiting in any way.

Figure 4:
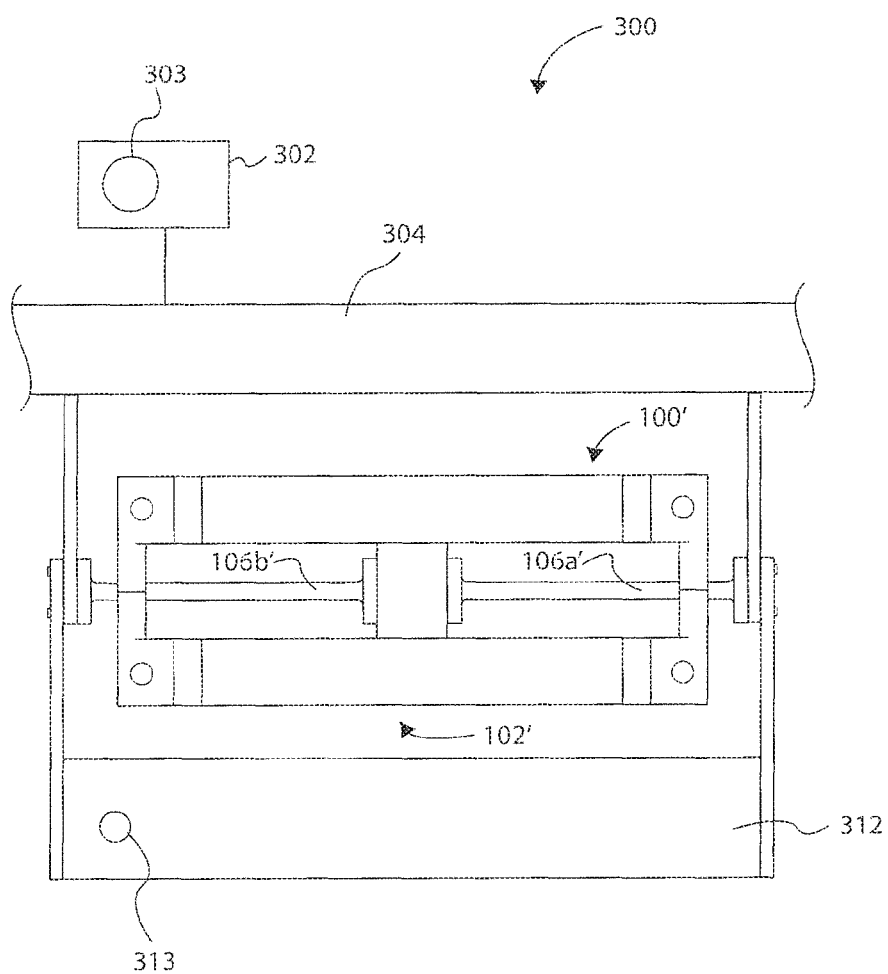
FIG. 4 is a side view of the tuned mass absorber assembly of FIG. 1, the tuned mass absorber assembly being coupled to a chassis and an electronics assembly payload, in accordance with an example of the present disclosure.

FIG. 4 shows an alternative example of a system 300 that incorporates a tuned mass absorber assembly 100' (e.g., similar or the same as tuned mass absorber assembly 100) for attenuating vibrations at a specific input frequency to an electronics assembly payload. More specifically, the system 300 can comprise a mechanical system 302 (shown schematically), such as a vehicle, aircraft, engine, electro mechanical system, or other mechanical system that generates vibrational energy, such as from operation of a rotational device 303 (e.g., a rotor or propeller driven aircraft). The mechanical system 302 can comprise a support structure chassis 304 (e.g., a frame or chassis of a vehicle like an aircraft), which can be directly or indirectly attached to first and second cross bar flexures 106a' and 106b' of the tuned mass absorber assembly 100'. An electronics assembly payload 312 (e.g., electro optical device, detector, sensor, or other sensitive electronics assembly) can be directly or indirectly attached to the first and second cross bar flexures 106a' and 106b' via attachment to mounts of the support structure chassis 304. In this manner, the support structure chassis 304 can be rigidly coupled to the electronics assembly payload 312 (i.e., unlike FIG. 3, where the vibration isolator 206 couples together the chassis and the payload). Similarly as described above, a mass and/or other properties of a mass structure 102' and a stiffness of the first and second cross bar flexures 106a' and 106b' can be designed and selected to minimize amplification of a specific range of input frequencies, including a specific input frequency, from vibrations generated by the mechanical system 302 and transferred to one or more electronics devices 313 of the payload, such as circuit boards, fiber optics lines, mirrors, CCDs, CMOSs, etc., of the electronics assembly payload 312.

FIG. 5A illustrates a tuned mass absorber assembly 500 that can comprise a mass structure 502 and a flexure system 504. As similarly detailed above, a mass or other properties of the mass structure 502 and a stiffness of the flexure system 504 can be designed and selected to provide or generate a tuned mass absorber assembly to minimize amplification of a specific input frequency generated in response to induced vibrations of a structure, such as from a support structure or chassis of a mechanical system. The flexure system 504 can comprise first and second flexure sections, such as a first cross bar flexure 506a and a second cross bar flexure 506b, supported by the mass structure 502, and extending in opposing directions from the mass structure 502 along the z axis. The flexure system 504 can comprise flexure section mounts 508a and 508b situated at distal ends of the first and second cross bar flexures 506a and 506b, respectively, and that are operable or configured to mount the tuned mass absorber assembly 500 to a structure subject to induced vibrations therein (see e.g., FIG. 3, where tuned mass absorber assembly 500 can replace tuned mass absorber assembly 100). In this example, the mass structure 502 is not made up of several components like the mass structure 102 discussed above and shown in FIGS. 1 and 2 (i.e., is not modular), but rather comprises a monolithic mass comprised of a single, solid or uniform piece of material, such as tungsten or other rigid material, which can be formed in the shape of a cube, a cuboid, a cylinder, a sphere, or other suitable shaped bodies or masses.

Each cross bar flexure 506a and 506b can comprise a flexure coupling to facilitate mounting to the mass structure 502 (e.g., see flexure couplings 542a and 542b that mount to left and right sides 540c and 540d, respectively, of the mass structure 502). The first and second cross bar flexures 506a and 506b can each comprise a respective cross bar portion (e.g., cross bar portions 546a and 546b) that extends along the z axis as elongated bars or beams. Each of the first and second cross bar flexures 506a and 506b can comprise a respective flexure section mount (see flexure section mounts 508a and 508b) operable to mount to a structure that generates a specific input frequency in response to induced vibrations of the structure, such as from a support structure or chassis of a mechanical system (e.g., similarly as described above regarding attaching cross bar flexures to respective components of FIGS. 3 and 4).

In some examples, a compliant device or element can be incorporated with the cross bar flexures of a tuned mass absorber assembly to attenuate vibrations along the z axis, thereby providing three axes of vibration tone attenuation. For instance, a compliant device 550 such as a rubber, elastic polymer, spring, or other compliant element can be attached to the flexure section mount 508b (and another compliant device could be attached to flexure section mount 508a). FIG. 5A shows the compliant device 550 in the form of an elastic disk or puck or sheet that is sandwiched and attached (e.g., fastened) between a mounting face of the flexure coupling 542b and a face of the mass structure 502. This provides some attenuation in a transverse axis (z axis) relative to the x and y axes. The compliant device 550 can be used similarly in the various other tuned mass absorber assemblies exemplified herein. In another example, cross bars (extending from a mass structure) may be stiff in the x and y axes, while a compliant device (e.g., 550) can be attached to ends of the cross bars to provide attenuation in the z axis. And, such compliant devices can be tuned to attenuate vibrations of a specific range of input frequencies, similarly as described regarding tuning the cross bar flexures exemplified herein. Alternatively, third and fourth flexures or compliant devices can be coupled between respective center portions of the cross bar flexures and the mass structure, such that the third and fourth flexures or compliant devices are oriented to flex in the third axis.

Figure 5B:
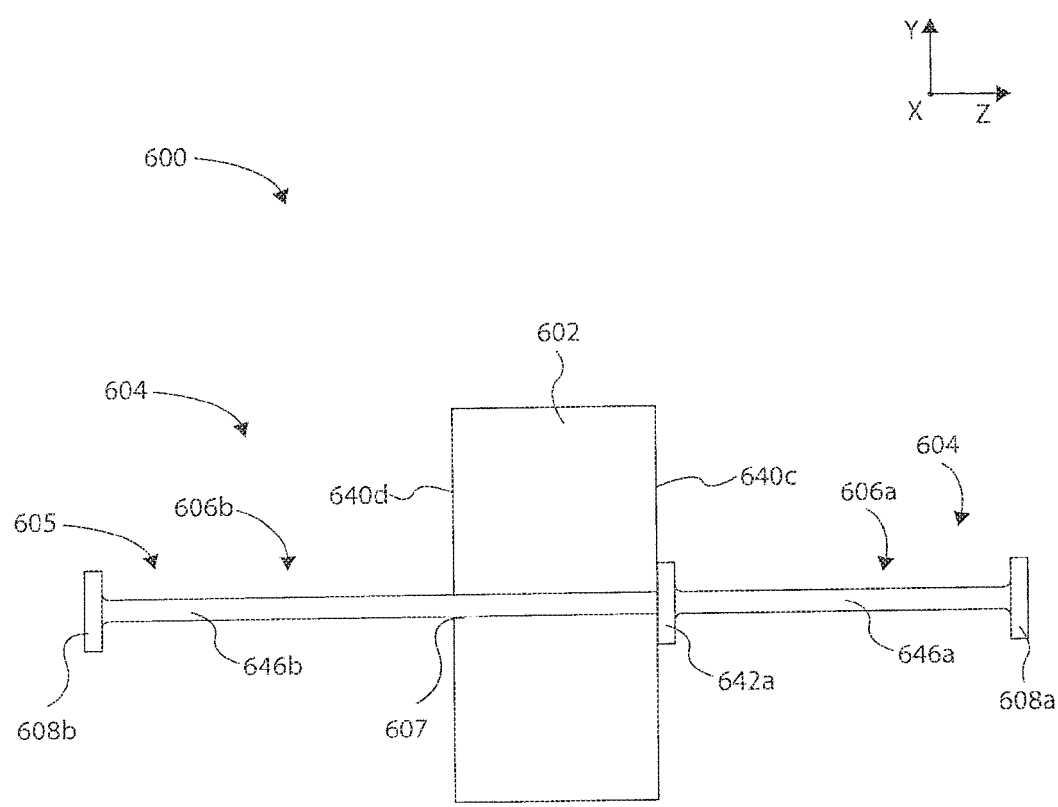
FIG. 5B is a side view of a tuned mass absorber assembly, in accordance with an example of the present disclosure.

FIG. 5B illustrates a tuned mass absorber assembly 600 that can comprise a mass structure 602 and a flexure system 604. As similarly detailed above, a mass or other properties of the mass structure 602 and a stiffness of the flexure system 604 can be designed and selected to provide or generate a tuned mass absorber assembly to minimize amplification of a specific input frequency generated in response to induced vibrations of a structure, such as from a support structure or chassis of a mechanical system. The flexure system 604 can comprise a single flexure 605 comprising first and second flexure sections, such as a first cross bar flexure 606a and a second cross bar flexure 606b, supported by the mass structure 602, and extending in opposing directions from the mass structure 602 along the z axis. The single flexure 605 can comprise flexure section mounts 608a and 608b situated at distal ends of the first and second cross bar flexures 606a and 606b, respectively, and that are operable or configured to mount the tuned mass absorber assembly 600 to a structure subject to induced vibrations therein (see e.g., FIG. 3, where tuned mass absorber assembly 600 can replace tuned mass absorber assembly 100). In this example, the mass structure 602 is not made up of several components like the mass structure 102 discussed above and shown in FIGS. 1 and 2 (i.e., is not modular), but rather comprises a monolithic mass comprised of a single, solid or uniform piece of material, such as tungsten or other rigid material, which can be formed in the shape of a cube, a cuboid, a cylinder, a sphere, or other suitable shaped bodies or masses. However, the single flexure 605 can replace the flexure system 104 of FIG. 1.

The cross bar flexure 606a can comprise a flexure coupling 642a to facilitate mounting to the right side 640c of the mass structure 602. The first and second cross bar flexures 606a and 606b can each comprise a respective cross bar portion (e.g., cross bar portions 646a and 646b) that extends along the z axis as elongated bars or beams. Each of the first and second cross bar flexures 606a and 606b can comprise a respective flexure section mount (see flexure section mounts 608a and 608b) operable to mount to a structure that generates a specific input frequency in response to induced vibrations of the structure, such as from a support structure or chassis of a mechanical system (e.g., similarly as described above regarding attaching cross bar flexures to respective components of FIGS. 3 and 4). The second cross bar flexure 606b can extend from the flexure coupling 642a through an aperture 607 of the mass structure 602 and extending out a left side 640d. The flexure section mount 608b can be a removable component so that the second cross bar flexure 606b can extend through the aperture 607 during assembly of the tuned mass absorber assembly 600. In one example, the flexure section mount 608b can be fastened to a distal end of the second cross bar flexure 606b via suitable fastening means, such as by a central fastener that extends through an outer surface of the flexure section mount 608b and into a central portion of an end surface of the second cross bar flexure 606b.

As mentioned above, FIGS. 6-8 show various alternative cross sectional areas of respective flexures extending through respective compliant stops. These figures represent different tuning capabilities in different axes that can be manipulated and controlled by varying the cross sectional area of a particular flexure. For instance, FIG. 6 shows a generally square cross sectional area of the cross bar flexure 106a, as further discussed above, which has the same widths in the x axis and y axis directions, thereby providing a similarly tuned flexure characteristics in both axes for attenuation of vibration of the same specific input frequencies in the both axes.

Figure 7:
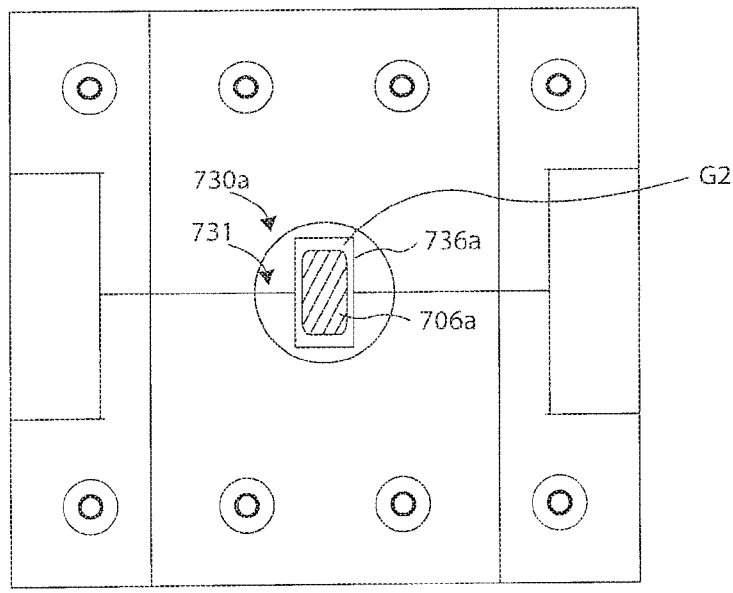
FIG. 7 is a cross sectional view of a tuned mass absorber assembly, similar to FIG. 1, and showing an alternative rectangular cross sectional area of a flexure section of the tuned mass absorber assembly.

As indicated above, the tuned mass absorber assembly can be tunable in multiple axes by configuring the cross-section of the cross bar flexure to have a non-uniform shape (i.e., a different length dimension in one axis as compared to a length dimension in another axis). FIG. 7 shows a flexure 706a having a generally rectangular cross sectional area, with the height of the flexure 706a having a greater length than a width of the flexure 706a. This cross-sectional configuration provides a flexure having a first stiffness in one axis, and a second stiffness in a different axis, therefore the tuned mass absorber assembly is differently tuned in each axis for attenuation of vibration of two different specific input frequencies, with the flexure 706a (along with the mass) being configured to attenuate one specific frequency in one axis, and another specific frequency in the other axis. However, in some systems with a rectangular cross sectional area of flexures, there may be the same or similar specific input frequency in both the x and y axes, depending on other variables, such as the stiffness of a base isolator. Note that a rectangular gap G2 is generated between a compliant flexure stop 730a and the flexure 706a, because the compliant flexure stop 730a can comprise and be defined by two-piece compliant bodies that come together to define a compliant bumper 731 having an aperture 736a with a rectangular shape or configuration, similarly as shown in FIG. 2 (but with a rectangular pass-through aperture).

Figure 8:
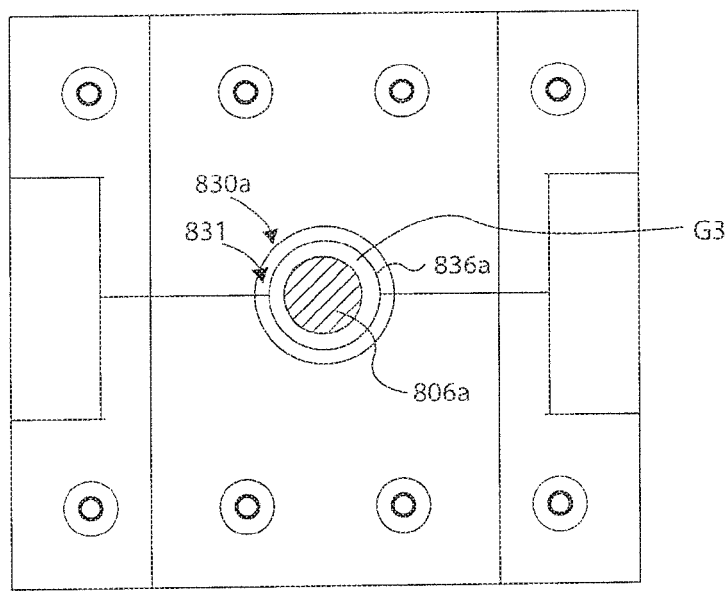
FIG. 8 is a cross sectional view of a tuned mass absorber assembly, similar to FIG. 1, and showing an alternative circular cross sectional area of a flexure section of the tuned mass absorber assembly.

FIG. 8 shows a flexure 806a having a circular cross sectional area, thereby providing a flexure or stiffness similarly selected and designed (i.e., tuned) in both axes for attenuation of vibration of a specific input frequency along both axes. Note that a circular gap G3 is generated between a compliant flexure stop 830a and the flexure 806a, because the compliant flexure stop 830a can be defined by two-piece compliant bodies that come together to define a compliant bumper 831 having an aperture 836a with a circular shape or oval configuration.

Figure 9:
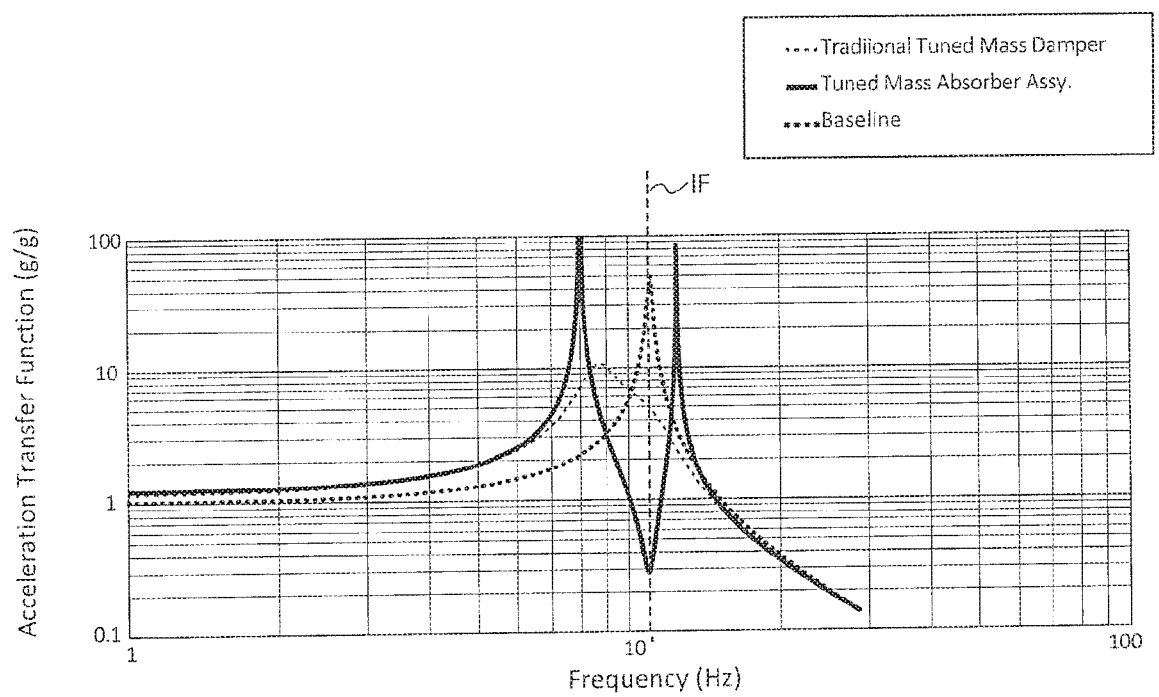
FIG. 9 is a graph of frequency vs. acceleration transfer function for three different systems, including 1) a traditional/known tuned mass damper, 2) a tuned mass absorber assembly of the present disclosure, and 3) a baseline of measured frequencies (no tuned mass damper or tuned mass absorber assembly).

FIG. 9 shows a graph illustrating attenuation of vibrations at a specific input frequency using a tuned mass absorber assembly as discussed herein. The specific frequency to be attenuated is represented by the vertical dashed line labeled input frequency (IF), which is the specific input frequency at the magnitude of the baseline vibrations, such as those generated by a mechanical system (e.g., mechanical system 202). One labeled curve shows attenuation data for a traditional/known tuned mass damper, and another labeled curve shows attenuation data from a tuned mass absorber assembly of the present invention (e.g., like tuned mass absorber assembly 100 incorporated into a system as shown in FIG. 3). As illustrated by the valley of the curve representative by the tuned mass absorber assembly, the lowest center peak of such curve is approximately aligned with the peak of the Baseline curve, which is approximately the specific input frequency IF that needs to be minimized or attenuated by the tuned mass absorber assembly of the present disclosure.

The "valley" of the combined system's acceleration transfer function can be defined by a specific range of input frequencies, which includes the specific input frequency IF, where the uppermost left peak is the lower end of the range, and the uppermost right peak is the upper end of the range. Note that such "valley" is a newly created anti-resonance that has been generated or created by a tuned mass absorber assembly of the present disclosure. Moreover, as shown by the curve of the traditional TMD, the point that its curve intersects the input frequency line IF is much higher in the graph along the y axis (acceleration transfer function axis) as compared to that achieved by the tuned mass absorber assembly of the present disclosure. This is one meaning of "minimizing" or "reducing" amplification of a specific input frequency with a tuned mass absorber assembly of the present disclosure, as compared to a traditional TMD incorporated into the same system as the tuned mass absorber assembly of the present disclosure. The difference in amplitude between designs at this input frequency is one factor that makes the design of the tuned mass absorber assembly effective at selectively attenuating vibration tones, as compared to a traditional TMD that has a broader response.

Note that the width of the valley (i.e., the spread between the two upper peaks) can be controlled or modified by selecting the size of the mass structure. That is, the greater the mass of the mass structure, the greater the spread between these two modes or peaks. Further note that the depth of the anti-resonance or "valley" can be controlled with the damping ratio of the system. Low damping (for example a damping ratio less than 0.02) creates a deeper anti-resonance or valley. This means more attenuation at this specific frequency.

As further illustrated in FIG. 9, additional or more mass increases the spread or distance between the two upper peaks in the acceleration transfer function of the "tuned mass absorber assembly" curve, which increases the width of the anti-resonance or valley.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A tuned mass absorber assembly, comprising:
    a mass structure;
    a flexure system comprising:
        first and second flexure sections supported at proximal ends by, and extending in opposing directions from, the mass structure; and
        flexure section mounts situated on distal ends of the first and second flexure sections, respectively, operable to mount the tuned mass absorber assembly to a structure subject to induced vibrations,
    wherein the mass structure comprises first and second flexure stop supports defining first and second apertures through the mass structure, the distal ends of the first and second flexure sections extending through the first and second apertures, respectively; and
    wherein a mass of the mass structure and a stiffness of the flexure system are selected and designed to tune the tuned mass absorber assembly to attenuate vibrations at a range of input frequencies that include a specific input frequency generated in response to induced vibrations of the structure.

2. The tuned mass absorber assembly of claim 1, wherein the mass structure comprises a monolithic mass structure.

3. The tuned mass absorber assembly of claim 1, wherein the mass structure comprises a multi-piece mass structure.

4. The tuned mass absorber assembly of claim 3, wherein the multi-piece mass structure comprises:
    a first mass section comprising first and second stop support half openings situated at opposite ends of the first mass section; and
    a second mass section comprising first and second stop support half openings situated at opposite ends of the second mass section and that cooperate with the first and second stop support half openings of the first mass section to form the first and second flexure stop supports, respectively;
    one or more intermediate mass sections coupled to the first and second mass sections,
    wherein the first and second flexure sections are coupled to the intermediate mass section and extend in opposite directions from the intermediate mass section through the first and second apertures of the first and second flexure stop supports.

5. The tuned mass absorber assembly of claim 4, wherein a cross-sectional area of the first and second apertures of the first and second flexure stop supports is larger than a cross-sectional area of a cross bar portion of each of the first and second flexure sections to provide a gap, such that the cross bar portions of each of the first and second flexure sections loosely fit within the first and second apertures in the first and second flexures stop supports, and wherein each of the first and second flexure sections are operable to move or sway in at least one direction along at least one axis.

6. The tuned mass absorber assembly of claim 4, further comprising first and second compliant bumpers supported within the first and second flexure stop supports, respectively, the compliant bumpers each comprising an aperture, wherein the first and second flexure stop supports operate together with the first and second compliant bumpers, respectively, such that the first and second flexure stop supports comprise compliant flexure stops, the first and second flexure sections extending in opposite directions from the center mass through the first and second apertures in the first and second compliant flexure stops, respectively.

7. The tuned mass absorber assembly of claim 6, wherein a cross-sectional area of the first and second apertures of the first and second compliant flexure stops is larger than a cross-sectional area of a cross bar portion of each of the first and second flexure sections, respectively, to provide a gap, such that the cross bar portions of each of the first and second flexure sections loosely fit within the first and second apertures in the first and second compliant flexure stops, such that each of the first and second flexure sections are operable to move or sway in at least one direction along at least one axis.

8. The tuned mass absorber assembly of claim 4, wherein the first and second mass sections and the intermediate mass section define a first chamber area and a second chamber area, wherein the first flexure section is situated in the first chamber area, the second flexure section is situated in the second chamber area.

9. The tuned mass absorber assembly of claim 1, wherein the first and second flexure sections are defined by a single flexure extending through a bore in the mass structure.

10. The tuned mass absorber assembly of claim 1, wherein the first and second flexure sections are defined by first and second individual flexures, each of the first and second flexures comprising a flexure coupling operable to mount the first and second flexures, respectively, to the mass structure.

11. The tuned mass absorber assembly of claim 1, wherein the first and second flexures are substantially identical to each other, and each comprise an elongate cross bar portion having a cross sectional area extending in a first axis such that the flexure is tuned to correspond to a first specific input frequency in the first axis, and extending in a second axis such that the flexure is tuned to correspond to a second specific input frequency in the second axis.

12. The tuned mass absorber assembly of claim 1, wherein the flexure section mounts are operable to mount to a vibration isolator coupleable to an electronics assembly payload and to the structure, such that the vibration isolator is operable to attenuate vibrations from the structure to the electronics assembly payload, and such that the tuned mass absorber assembly is operable to attenuate vibrations at the specific input frequency from the structure to the electronics assembly payload.

13. The tuned mass absorber assembly of claim 1, wherein the tuned mass absorber assembly is substantially symmetrical about three different planes that are orthogonal to one another, and that extend through the tuned mass absorber assembly.

14. The tuned mass absorber assembly of claim 1, wherein a volume of the mass structure encompasses a majority of a three dimensional perimeter envelope of the tuned mass absorber assembly.

15. A system for attenuating vibrations at a range of frequencies, that includes a specific input frequency, tending to propagate to an electronics assembly payload, the system comprising:
a vibration isolator having a first mount body coupleable to a support structure chassis, and a second mount body coupled to the first mount body by at least one compliant device, wherein the second mount body is in support of an electronics assembly payload;
a mass structure; and
first and second flexure sections supported by, and extending in opposing directions from, the mass structure, each of the first and second flexure sections having a flexure section mount attached to one of the first or second mount bodies of the vibration isolator, such that the mass structure is suspended by the first and second flexure sections about the vibration isolator, wherein the mass structure and the first and second flexure sections define a tuned mass absorber assembly,
wherein a mass of the mass structure and a stiffness of the first and second flexure sections are selected and designed to tune the tuned mass absorber assembly to attenuate vibrations at a specific range of frequencies that includes a specific input frequency generated in response to induced vibrations of the support structure chassis.

16. The system of claim 15, further comprising a mechanical system operable to generate vibrations, and comprising the support structure chassis subjectable to the vibrations at the specific range of frequencies, the system further comprising the electronics assembly payload mounted to the second mount body of the vibration isolator.

17. The system of claim 16, wherein the mechanical system comprises a vehicle having a rotor operable to generate vibrations at the specific input frequency, and wherein the electronics assembly payload comprises an electro-optical sensor assembly.

18. The system of claim 15, wherein the mass structure comprises:
a first mass section comprising first and second stop support half openings situated at opposite ends of the first mass section;
a second mass section comprising first and second stop support half openings situated at opposite ends of the second mass section and that cooperate with the first and second stop support half openings of the first mass section to form first and second stop supports, respectively, and first and second flexure stops, respectively, defining respective first and second apertures through the mass structure;
an intermediate mass section coupled to the first and second mass sections, wherein the first and second flexure sections are coupled to the intermediate mass section and extend in opposite directions from the intermediate mass section; and
a first compliant bumper supported by the first stop support, and a second compliant bumper supported by the second stop support, wherein a flexure portion of the first flexure section loosely fits through an aperture of the first compliant bumper, and wherein a flexure portion of the second flexure section loosely fits through an aperture of the second compliant bumper.

19. A system for attenuating vibrations at a specific input frequency to an electronics assembly payload, comprising:
a mass structure;
first and second flexure sections supported at proximal ends by, and extending in opposing directions from, the mass structure, each of the first and second flexure sections having a flexure section mount;
a mechanical system operable to generate vibrations, and comprising a support structure chassis subjectable to the vibrations at a specific input frequency, the support structure chassis coupled to the flexure section mounts of the first and second flexure sections; and
an electronics assembly payload having a support structure coupled to the flexure section mounts of the first and second flexure sections,
wherein the mass structure comprises first and second flexure stop supports defining first and second apertures through the mass structure, distal ends of the first and second flexure sections extending through the first and second apertures, respectively; and
wherein a mass of the mass structure and a stiffness of the first and second flexure sections are selected and designed to attenuate vibrations at the specific input frequency from the support structure chassis to the electronics assembly payload.

20. The system of claim 19, further comprising a first compliant bumper supported by the first flexure stop support, and a second compliant bumper supported by the second flexure stop support, wherein a flexure portion of the first flexure section loosely fits through an aperture of the first compliant bumper, and wherein a flexure portion of the second flexure section loosely fits through an aperture of the second compliant bumper.

* * * * *